(12) United States Patent
Lechner et al.

(10) Patent No.: US 11,007,840 B2
(45) Date of Patent: May 18, 2021

(54) BEARING ELEMENT AND METHOD FOR PRODUCING A STABILIZER OF A VEHICLE

(71) Applicants: THYSSENKRUPP FEDERN UND STABILISATOREN GMBH, Hagen (DE); thyssenkrupp AG, Essen (DE)

(72) Inventors: Dieter Lechner, Düsseldorf (DE); Sebastian Bernard, Cologne (DE)

(73) Assignees: ThyssenKrupp Federo und Stabilisatoren GmbH, Hagen (DE); thyssenkrupp AG, Essen (DE)

(*) Notice: Subject to any disclaimer, the term of this patent is extended or adjusted under 35 U.S.C. 154(b) by 75 days.

(21) Appl. No.: 15/559,285

(22) PCT Filed: Nov. 20, 2015

(86) PCT No.: PCT/EP2015/077201
§ 371 (c)(1),
(2) Date: Sep. 18, 2017

(87) PCT Pub. No.: WO2016/155851
PCT Pub. Date: Oct. 6, 2016

(65) Prior Publication Data
US 2018/0056747 A1    Mar. 1, 2018

(30) Foreign Application Priority Data
Mar. 30, 2015  (DE) .................... 10 2015 104 864.7

(51) Int. Cl.
*B60G 21/055* (2006.01)
*F16C 17/10* (2006.01)
(Continued)

(52) U.S. Cl.
CPC .......... *B60G 21/0551* (2013.01); *F16C 17/10* (2013.01); *F16C 33/046* (2013.01);
(Continued)

(58) Field of Classification Search
CPC ................... B60G 2204/1222; B60G 21/0551
See application file for complete search history.

(56) References Cited

U.S. PATENT DOCUMENTS

| | | | |
|---|---|---|---|
| 2,606,020 A | 8/1952 | Anderson | |
| 3,366,356 A * | 1/1968 | Fisher | ...... F16B 9/02 16/2.1 |

(Continued)

FOREIGN PATENT DOCUMENTS

| | | |
|---|---|---|
| CN | 1766362 A | 5/2006 |
| CN | 101529103 A | 9/2009 |

(Continued)

OTHER PUBLICATIONS

English Translation of International Search Report issued in PCT/EP2015/077201, dated Jan. 12, 2016 (dated Jan. 20, 2016).
(Continued)

*Primary Examiner* — Nicole T Verley
(74) *Attorney, Agent, or Firm* — thyssenkrupp North America, LLC

(57) ABSTRACT

A bearing element for receiving a stabilizer on a vehicle may include a first elastomer body and a second elastomer body that are of half-shell-shaped design and that are arranged on one another so as to form a receiving passage. The receiving passage may receive a stabilizer rod of the stabilizer. The first and second elastomer bodies can be pressed onto and cohesively attached to the stabilizer rod of the stabilizer such that the stabilizer rod extends through the receiving passage. Further, the inner contour of the receiving passage may be configured so as to deviate from a circular contour.

20 Claims, 3 Drawing Sheets

(51) Int. Cl.
*F16C 33/04* (2006.01)
*B29L 31/04* (2006.01)

(52) U.S. Cl.
CPC . *B29L 2031/045* (2013.01); *B60G 2204/1222* (2013.01); *B60G 2204/41* (2013.01); *F16C 2326/01* (2013.01)

(56) References Cited

U.S. PATENT DOCUMENTS

| | | | | |
|---|---|---|---|---|
| 4,916,749 | A * | 4/1990 | Urban | B60G 21/0551 |
| | | | | 384/125 |
| 5,013,166 | A * | 5/1991 | Domer | B60G 21/0551 |
| | | | | 267/276 |
| 5,290,018 | A * | 3/1994 | Watanabe | B60G 21/0551 |
| | | | | 267/141.3 |
| 5,413,374 | A * | 5/1995 | Pierce | B60G 7/00 |
| | | | | 267/141.2 |
| 5,520,465 | A * | 5/1996 | Kammel | B60G 21/0551 |
| | | | | 267/293 |
| 6,685,381 | B1 * | 2/2004 | Sugita | B60G 9/00 |
| | | | | 280/124.152 |
| 7,065,875 | B2 * | 6/2006 | Cai | B60G 21/0551 |
| | | | | 219/156 |
| 7,380,775 | B2 * | 6/2008 | Niwa | B60G 21/0551 |
| | | | | 267/293 |
| 8,382,129 | B2 * | 2/2013 | Sugiura | B60G 21/0551 |
| | | | | 267/140.12 |
| 2006/0091595 | A1 | 5/2006 | Hayashi | |
| 2006/0125165 | A1 * | 6/2006 | Niwa | B60G 21/0551 |
| | | | | 267/293 |
| 2008/0067727 | A1 | 3/2008 | Schwarz | |
| 2011/0219618 | A1 | 9/2011 | Lien | |
| 2012/0029926 | A1 | 2/2012 | Krishnan | |
| 2012/0211958 | A1 * | 8/2012 | Lam | B60G 21/0551 |
| | | | | 280/124.106 |
| 2012/0299261 | A1 | 11/2012 | Nagai | |

FOREIGN PATENT DOCUMENTS

| | | |
|---|---|---|
| CN | 201613795 U | 10/2010 |
| CN | 102797788 A | 11/2012 |
| DE | 19945044 A | 5/2000 |
| DE | 102006032826 A | 1/2008 |
| DE | 102007024740 A | 12/2008 |
| DE | 102009011818 A | 10/2009 |
| DE | 102010060198 A | 5/2012 |
| DE | 102010054503 A | 6/2012 |
| DE | 102011055181 A | 5/2013 |
| JP | H0425629 A | 1/1992 |
| JP | H04025629 A | 1/1992 |
| JP | H11291736 A | 10/1999 |
| JP | 2004142586 A | 5/2004 |
| JP | 2005207474 A | 8/2005 |
| JP | 2006-170293 A | 6/2006 |
| JP | 2006-183768 A | 7/2006 |
| JP | 2010-058564 A | 3/2010 |
| JP | 2014-214836 A | 11/2014 |
| RU | 2435677 C2 | 3/2011 |
| WO | 2005058622 A | 6/2005 |
| WO | 2006112092 A | 11/2008 |

OTHER PUBLICATIONS

English machine translation of DE19945044A.
English machine translation of DE102007024740A.
English machine translation of DE102010054503A.
English machine translation of DE102011055181A.
English machine translation of JPH11291736A.
English machine translation of JPH0425629A.

* cited by examiner

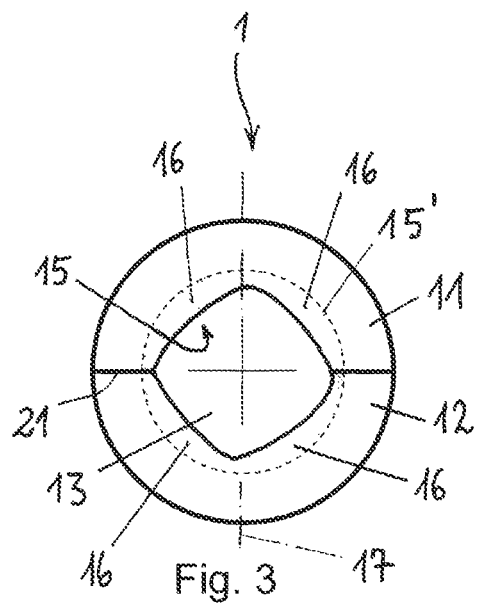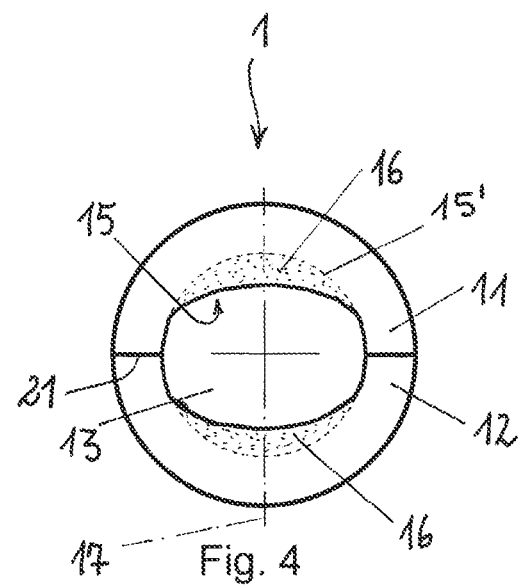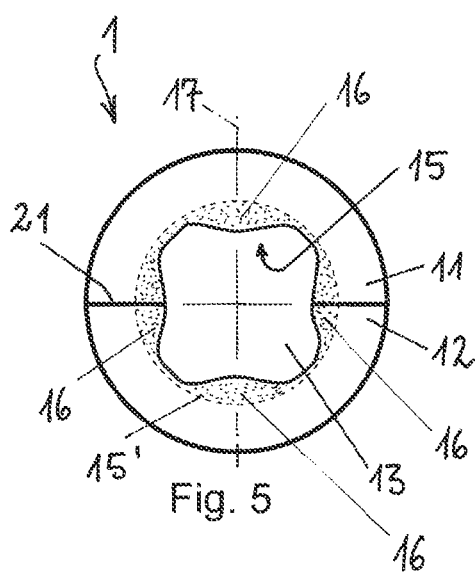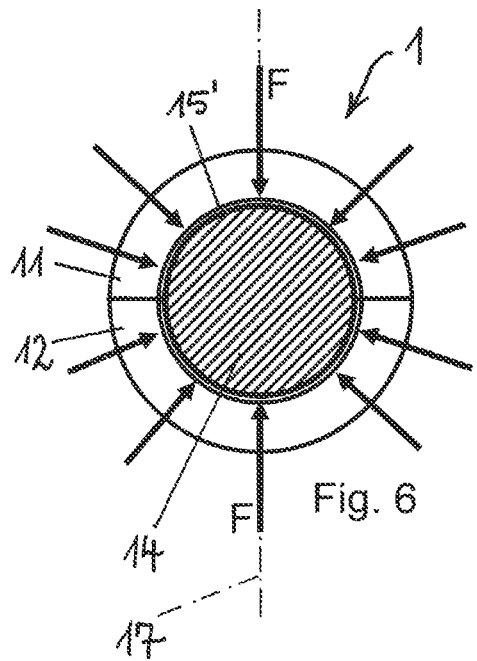

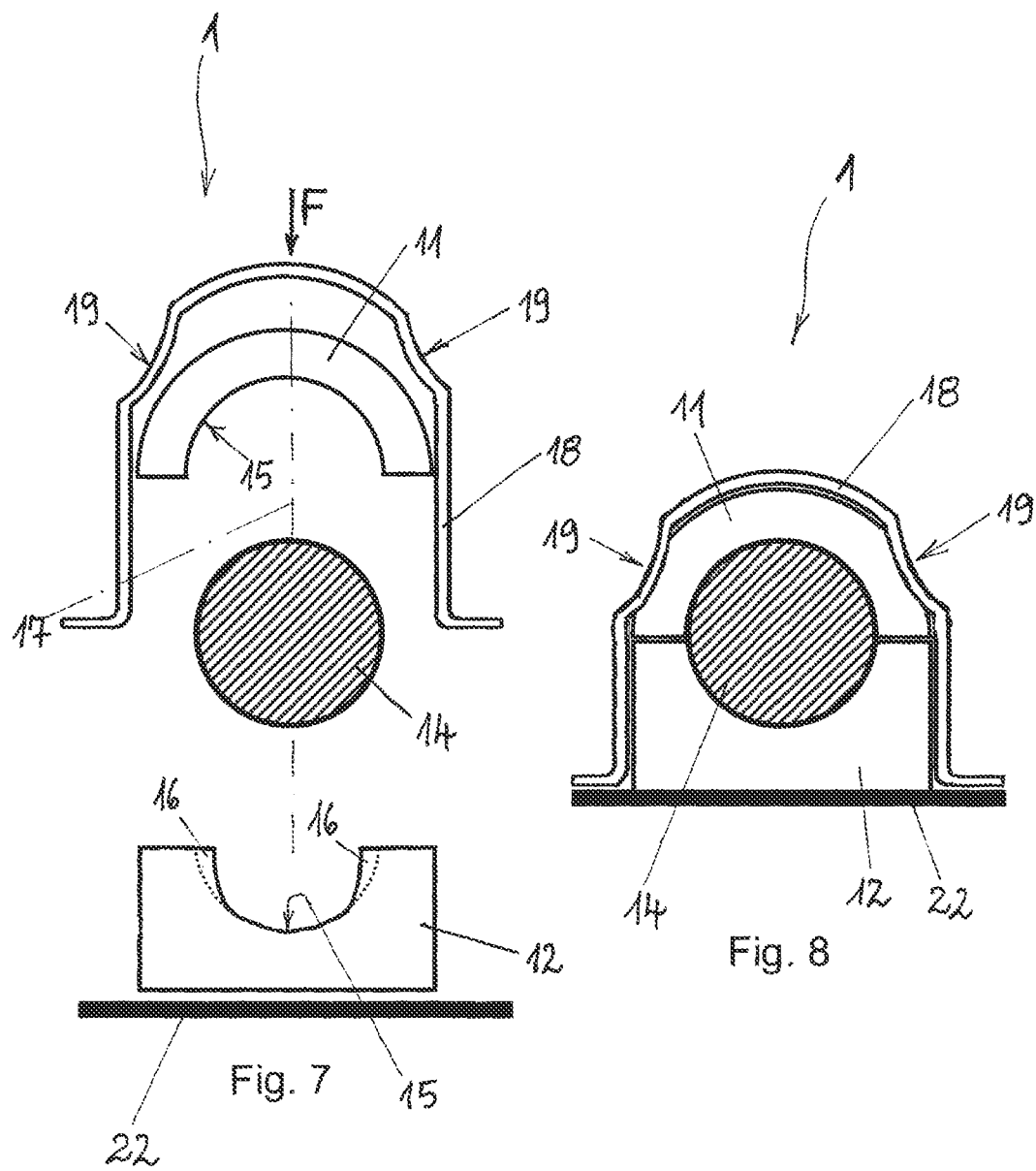

BEARING ELEMENT AND METHOD FOR PRODUCING A STABILIZER OF A VEHICLE

CROSS REFERENCE TO RELATED APPLICATIONS

This application is a U.S. National Stage Entry of International Patent Application Serial Number PCT/EP2015/077201, filed Nov. 20, 2015, which claims priority to German Patent Application No. DE 10 2015 104 864.7 filed Mar. 30, 2015, the entire contents of both of which are incorporated herein by reference.

FIELD

The present disclosure generally relates to bearing elements, including bearing elements for receiving stabilizers in motor vehicles and methods for producing stabilizers of motor vehicles.

BACKGROUND

A simple construction of a bearing element of the type of interest here is presented in DE 10 2010 054 503 A1. The bearing element serves for receiving a stabilizer on a vehicle and comprises elastomer bodies referred to as rubber bearings, wherein it can be seen that the two elastomer bodies do not need to be of the same shape as one another in order to form the generic bearing element. The lower elastomer body, which adjoins the motor vehicle component, has a cross-sectional shape which differs from an upper elastomer body. However, the half-shell-shaped inner regions of the two elastomer bodies form a circular inner contour through which the stabilizer rod extends. The two elastomer bodies are held by a receiving means in the form of a clamp. To press the elastomer bodies onto the stabilizer rod, use is generally made of a tool which comprises a receiving means for receiving the elastomer bodies or which itself forms said receiving means, wherein the receiving means may also be formed by a clamp which serves for the subsequent fastening of the bearing element to a motor vehicle component. Here, the joining direction is perpendicular to the parting plane between the two elastomer bodies.

A further exemplary embodiment of a bearing element is presented in DE 10 2009 011 818 A1. The presented bearing element comprises two elastomer bodies which, for pressing onto the stabilizer rod, are inserted into two so-called receptacles. The receptacles form molding tools with an inner contour into which the elastomer bodies, referred to as polymer bodies, are inserted by way of their outer contour. The inner contour of the receptacles is in this case adapted to the outer contour of the elastomer bodies, wherein the outer contour comprises elevations, for example for preventing rotation of the elastomer bodies in the clamp during the later operation of the bearing elements.

The bearing elements are designed to receive the stabilizer on a vehicle, and the stabilizer serves for the roll stabilization of the vehicle. The stabilizer comprises a stabilizer rod, wherein stabilizers are also known which are constructed from multiple stabilizer rods. The stabilizer rod is in this case normally connected to a motor vehicle component, for example the vehicle frame, by means of the elastomer bodies and connectors fixed over said elastomer bodies. Here, the prior art involves the cohesive connection of the elastomer bodies to the stabilizer rod. To produce said cohesive connection, use is made, for example, of adhesives or adhesion promoters. The reaction of the adhesive or adhesion promoter with the elastomer body and with the normally coated stabilizer rod may be influenced for example by pressure, time and temperature. It is a disadvantage that, commonly, there is no defined, in particular uniform pressure distribution over the entire contact area between the surface of the stabilizer rod and the elastomer bodies, such that the adhesion promoter situated in between is subjected to a varying pressure over the circumference. It is also the case that the adhesive, in a still-flowable phase, is squeezed out of partial regions between the stabilizer rod and the elastomer bodies. The stabilizer rod commonly comprises a circular cross section at least at the seat points of the bearing elements, wherein the inner contour of the elastomer bodies also comprises a circular contour for forming the receiving passage. A result of this problem is that, owing to an uneven or at least disadvantageous pressure distribution, the adhesion between the elastomer bodies and the stabilizer rod is not uniform over the full circumference, and as a result, a failure of the connection can preferentially occur at locations of relatively poor adhesion.

BRIEF DESCRIPTION OF THE FIGURES

FIG. 3 is a cross-sectional view of two example placed-together elastomer bodies, with a first design of thickened portions for forming a non-circular inner contour.

FIG. 4 is a cross-sectional view of two more example placed-together elastomer bodies, with a further design of thickened portions for forming a non-circular inner contour.

FIG. 5 is a cross-sectional view of two example placed-together elastomer bodies, with a further design of thickened portions with an inner contour having multiple thickened portion.

FIG. 6 is a schematic cross-sectional view of two example elastomer bodies pressed onto a stabilizer rod by an assembly force, wherein multiple force arrows indicate a uniform force distribution over a circumference of the stabilizer rod.

FIG. 7 is a cross-sectional view of another example bearing element with elastomer bodies received in a receiving means.

FIG. 8 is a cross-sectional view of the example bearing element of FIG. 7 in a fully assembled state on a motor vehicle component.

DETAILED DESCRIPTION

Figure 1:
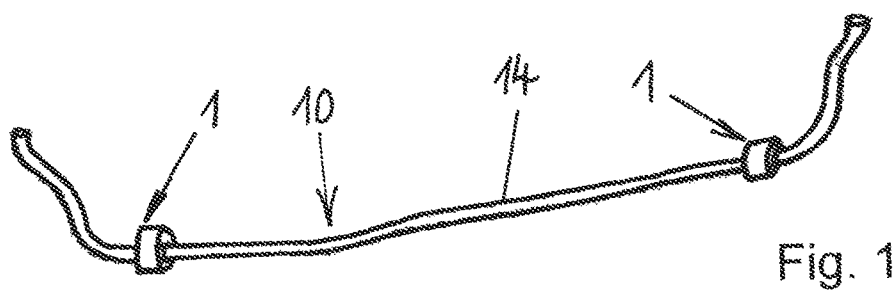
FIG. 1 is a perspective view of an example stabilizer with a stabilizer rod and with two bearing elements for receiving the stabilizer rod on a motor vehicle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims.

In addition, all references to one skilled in the art shall be understood to refer to one having ordinary skill in the art.

The present disclosure generally concerns bearing elements for receiving stabilizers on vehicles. An example bearing element may include a first elastomer body and a second elastomer body that are of half-shell-shaped design and that are arranged on one another so as to form a receiving passage for receiving a stabilizer rod. The elastomer bodies can be pressed onto and cohesively attached to the stabilizer rod of the stabilizer such that the stabilizer rod extends through the receiving passage.

One example object of the present disclosure is to further develop a bearing element for receiving a stabilizer on a vehicle, in the case of which bearing element improved adhesion between the elastomer bodies and the stabilizer rod is achieved. Another object of the present disclosure is to propose a method for arranging a bearing element on a stabilizer rod, by means of which method the abovementioned disadvantages can be overcome. An example object of the present disclosure is to optimize, and in particular homogenize, the pressure distribution between the elastomer bodies and the stabilizer rod of the bearing element.

The invention encompasses the technical teaching whereby the inner contour of the receiving passage is designed so as to deviate from a circular contour.

The essence of the invention relates to a special design of the elastomer bodies with an inner contour, which elastomer bodies, when placed together, form a receiving passage which comprises an inner contour which deviates from a circular contour. When said elastomer bodies are pressed onto the stabilizer rod, it is thus possible, in a manner dependent on the shape of the inner contour, for a defined pressure distribution between the elastomer bodies and the stabilizer rod to be realized. It is primarily possible for the deviation from the circular contour to be configured such that a pressure distribution which is uniform over the circumference is achieved, though it may also be advantageous if the pressure distribution assumes uneven but defined values over the circumference relative to the joining direction from which the two elastomer bodies are joined together. The actual definition of the pressure distribution in a manner dependent on the joining direction of the elastomer bodies can, according to the invention, be set by means of the design of the inner contour of the receiving passages so as to deviate from a circular contour.

The inner contour according to the invention of the receiving passage in this case deviates from a circular contour on a macroscopic scale, such that an inner contour with structures, undulations, grooves, teeth, serrations or other surface irregularities do not fall within the concept of the invention.

An adhesion promoter may be introduced between the elastomer bodies and the stabilizer rod. In particular, the inner contour of the receiving passage may in this case be designed such that, when the elastomer bodies are pressed onto the stabilizer rod, the adhesion promoter is pressed uniformly, or in a defined manner in accordance with a predefined pressure profile, between the inner contour and stabilizer rod.

In an advantageous refinement of the concept of the invention, the inner contour of the receiving passage is designed such that, when the elastomer bodies are pressed onto the stabilizer rod, a uniform distribution of the adhesive over the circumference of the stabilizer rod can be generated. If the inner contour is formed for example with a varying radius, which is configured such that the adhesion promoter is not squeezed out of the main force introduction region, then it is ultimately possible, when the full assembly force is applied, to achieve a uniform distribution of the adhesion promoter over the circumference of the stabilizer rod. In particular, the adhesion promoter is no longer pressed out of the region of the introduction of force around the joining direction.

In an advantageous embodiment of the bearing element according to the invention, the inner contour comprises thickened portions which project into the receiving passage for the leadthrough of the stabilizer rod and which are deformable when the elastomer bodies are arranged on the stabilizer rod. Owing to the flexible characteristics of the elastomer bodies, the thickened portions can yield, such that, when the full assembly force is applied, contact between the elastomer bodies and the stabilizer rod is achieved over the full circumference. In particular, the thickened portions may be designed such that regions of particularly high pressures in the assembly axis are avoided, and such that, also, no regions of very low pressures form, which are situated for example laterally with respect to the joining axis.

For example, the elastomer bodies are joined together from a joining direction, and the thickened portions are situated in the inner contour of the receiving passage laterally with respect to the joining direction. It may however alternatively also be provided that the thickened portions are formed in the inner contour of the receiving passage exactly in the region of the joining direction. It is also possible for multiple, in particular two or four, thickened portions to be formed so as to be distributed over the circumference of the inner contour. The thickened portions may also comprise free-form surfaces which are calculated for example numerically by computer and which may result for example from a topology optimization.

If the joining direction runs in a 6-12 o'clock position, it is for example possible for thickened portions to be provided in the 3 o'clock position and in the 9 o'clock position, which thickened portions ultimately lead to a uniform pressure distribution over the circumference of the stabilizer rod. In the context of the invention, it is however also conceivable for the thickened portions to be provided in targeted fashion in the 12 o'clock position and in the 6 o'clock position, for example if it is sought to achieve a targeted, possibly also non-uniform pressure distribution.

Here, the thickened portions project into the inner contour of the receiving passage in the state in which the elastomer bodies are not subjected to force. Owing to the elastic spring-back characteristics of the elastomer bodies, these however lie closely against the circumferential surface of the stabilizer rod over the full circumference, regardless of the design of the thickened portions, when the assembly force is applied.

At least one of the elastomer bodies may for example be seated in a receiving means, wherein the deviation of the inner contour of the receiving passage from a circular contour is formed by a shaping of the receiving means. In the separated state of the elastomer body in which it is not subjected to force, said elastomer body may comprise an inner contour in accordance with a circular shape, and it is only the case when the elastomer body is inserted into the receiving means, for example into a tool or for example into a receiving clamp for the subsequent mounting of the stabilizer on the motor vehicle component, that indentations formed in the receiving means push the thickened portions into the elastomer body by virtue of the material of the elastomer body being pushed through from the outer side to the inner contour. In particular if the elastomer bodies are pressed onto the stabilizer rod by associated receiving means, it is possible for the desired deviation from the inner contour to be achieved by means of a specific shaping of the receiving means, for example indentations which press into the elastomer body from the outside.

The invention is also directed to a method for arranging a bearing element on a stabilizer rod of a stabilizer for a vehicle, wherein a first elastomer body and a second elastomer body, each of half-shell-shaped form, are provided, and wherein the elastomer bodies are arranged on one another so as to form a receiving passage such that the stabilizer rod of the stabilizer extends through the receiving passage. According to the invention, firstly, at least one elastomer body with an inner contour for forming the receiving passage is provided, which inner contour is designed so as to deviate from a circular contour, and according to the invention, the elastomer body is pressed onto the stabilizer rod with elastic deformation of at least one of the inner contours of the elastomer bodies, such that the inner contour of the at least one elastomer body molds onto the contour of the stabilizer rod.

In one refinement of the method, at least one receiving means is provided, for example a tool or a clamp for the later fastening of the bearing unit to a motor vehicle component, wherein the deviation of the inner contour of the receiving passage from a circular contour is formed by a shaping of the receiving means.

In an advantageous refinement of the method according to the invention, the elastomer body is received in the receiving means, wherein the receiving means comprises at least one indentation which is geometrically replicated in the elastomer body when an assembly force is applied, such that the thickened portion which points into the inner contour is formed.

The formation of thickened portions may be performed only in one elastomer body, wherein receiving means may also be provided for receiving both elastomer bodies, such that thickened portions are present in each of the elastomer bodies.

In an abstraction of the invention, a particular pressure distribution between the elastomer bodies and the stabilizer rod may also be generated in that the desired pressure distribution is generated when the elastomer bodies are pressed on by means of the tool, for example by the receiving means, and the generation of the thickened portions or the deviation of the inner contour from a circular contour is performed only virtually, because the inner contour adapts to the circular outer contour of the stabilizer rod already when the assembly force is applied. Thickened portions are thus generated not geometrically but merely in the form of possible deformations, if the stabilizer rod were absent when the assembly force is applied.

FIG. 1 shows a stabilizer 10 for a motor vehicle in a perspective view, and the stabilizer 10 comprises a stabilizer rod 14 which can be received by means of two bearing elements 1 on a motor vehicle component (not illustrated). The stabilizer serves for the roll stabilization of the vehicle, and is normally connected to the vehicle by means of elastomer bearings and connectors fixed over said elastomer bearings. The elastomer bearings form constituent parts of the bearing elements 1, which are rigidly connected to the motor vehicle component, for example to the vehicle frame, by corresponding receiving means. In this way, the stabilizer rod 14 can perform small torsional movements in the bearing element 1.

Figure 2:
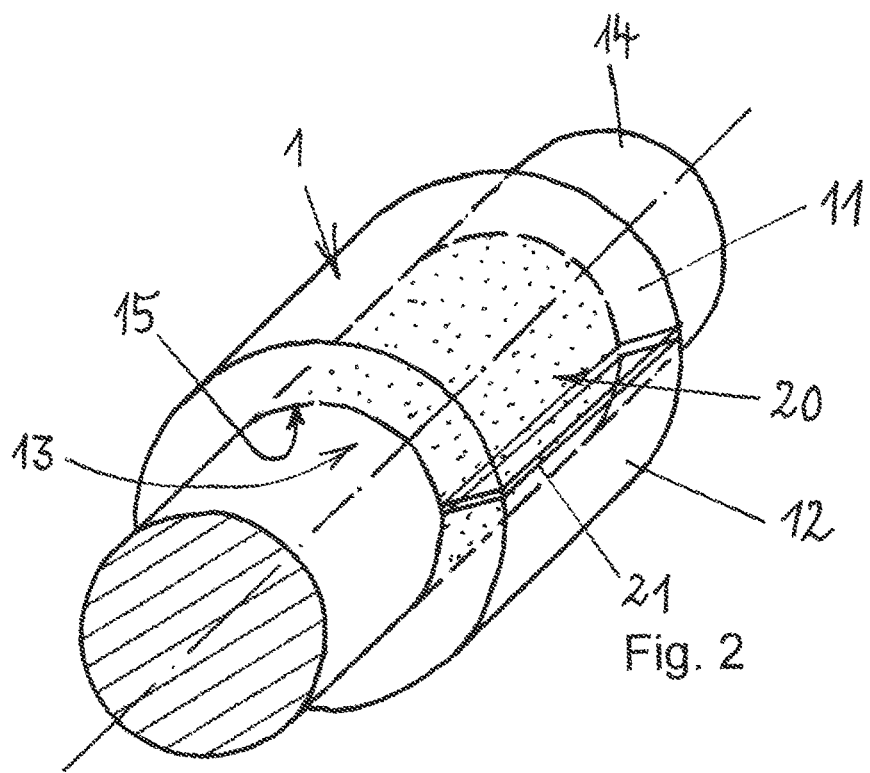
FIG. 2 is a schematic perspective view of a section of an example stabilizer rod with a bearing element comprising two elastomer bodies.

FIG. 2 schematically shows, in an enlarged view, a bearing element 1 in an arrangement on a partially illustrated stabilizer rod 14. The bearing element 1 comprises a first elastomer body 11 and a second elastomer body 12, and the elastomer bodies 11 and 12 are of half-shell-shaped design and are arranged opposite one another on the stabilizer rod 14 and form a receiving passage 13 through which the stabilizer rod 14 extends. The elastomer bodies 11 and 12 are of half-shell-shaped design and are placed together in a parting plane 21. The elastomer bodies 11 and 12 form an inner contour 15 which is adapted to the circular cross section of the stabilizer rod 14. The elastomer bodies 11 and 12 are pressed onto the stabilizer rod 14 with the application of an assembly force and are held on said stabilizer rod, for example by a receiving means, which is likewise not shown in the illustration.

FIGS. 3, 4 and 5 show exemplary embodiments of bearing elements 1 with various configurations of the inventive features. The bearing elements 1 comprise a first elastomer body 11 and a second elastomer body 12, and the elastomer bodies 11 and 12 are of half-shell-shaped design and are placed together in a respective parting plane 21. Owing to the half-shell-shaped form of the elastomer bodies 11 and 12, a receiving passage 13 is formed through which a stabilizer rod (not shown) extends when the elastomer bodies 11 and 12 are pressed onto said stabilizer rod. If the elastomer bodies 11 and 12 are pressed onto a stabilizer rod with a circular cross section, the result, in the presence of elastic deformation of the elastomer bodies 11, 12, is a likewise circular inner contour 15', indicated by a dashed line.

In the exemplary embodiments in FIGS. 3, 4 and 5, the inner contour 15 deviates from a circular contour, as will be discussed in more detail below.

FIG. 3 comprises elastomer bodies 11 and 12 with thickened portions 16 pointing into the receiving passage 13. In relation to the joining direction 17 from which the two half-shell-shaped elastomer bodies 11, 12 are joined together, the thickened portions 16 are provided laterally, such that each of the elastomer bodies 11 and 12 comprises two thickened portions 16. If the elastomer bodies 11 and 12 are pressed onto a stabilizer rod 14 by being subjected to an assembly force in said joining direction 17, the elastomer bodies 11, 12 lie closely against the circular inner contour 15' of the stabilizer rod (not shown), and the thickened portions 16 spring back elastically. A substantially uniform pressure distribution over the circumference of the receiving passage 13 can be achieved as a result.

FIG. 4 shows an exemplary embodiment with thickened portions 16 which are situated in the region of the joining direction 17. This can give rise to a special pressure distribution, which may for example be desired, with maximum values in the region of the joining direction and with minimum values laterally with respect to the joining direction.

FIG. 5 shows a further exemplary embodiment of the bearing element 1 with elastomer bodies 11 and 12 which, forming the receiving passage 13, comprise four thickened portions 16. The thickened portions 16 are situated both in the region of the joining direction 17 and laterally with respect to the joining direction 17.

FIG. 6 shows, by way of example, a cross section through two elastomer bodies 11 and 12 which are pressed onto a stabilizer rod 14. Here, the elastomer bodies 11 and 12 are pressed on with the application of an assembly force F in the joining direction 17. The multiplicity of force arrows indicates a force distribution which is substantially uniform over the circumference, by virtue of the fact that the thickened portions (see exemplary embodiments of FIGS. 3, 4 and 5) spring back and the elastomer bodies 11 and 12 assume the circular inner contour 15'.

FIG. 7 shows a modified exemplary embodiment of a bearing element 1 with a first elastomer body 11 and a second elastomer body 12, and the two elastomer bodies 11, 12 are illustrated spaced apart from the stabilizer rod 14 and are consequently in a force-free state. A receiving means 18 which is designed as a clamp and which can be fastened to a motor vehicle component 22, as shown in FIG. 8, serves for applying the assembly force F.

The receiving means 18 comprises indentations 19 such that the elastomer body 11 comprises thickened portions pointing into the inner contour 15 imparted to it in the region of the indentations 19 when the assembly force F is applied to the elastomer body 11 via the receiving means 18, for example in accordance with the thickened portions 16 as illustrated in the elastomer body 11 in FIG. 3. Consequently, regions of increased pressures arise in the regions of the indentations 19, which increased pressures can lead to an ultimately uniform pressure distribution taking into consideration the assembly force F.

The elastomer body 12 comprises thickened portions 16 which are provided laterally with respect to the joining direction 17 and which, when they spring back, can likewise lead to regions of increased pressure, such that, ultimately, in the assembled arrangement of the bearing element 1, see FIG. 8, a pressure which is uniform over the circumference of the stabilizer rod 14 can be generated between the elastomer bodies 11 and 12 and the stabilizer rod 14.

The invention is not restricted in terms of its design to the preferred exemplary embodiments presented above. Rather, numerous variants are conceivable which make use of the presented solution even in the case of fundamentally different embodiments. All of the features and/or advantages that emerge from the claims, from the description or from the drawings, including design details or spatial arrangements, may be essential to the invention both individually and in a wide variety of combinations.

LIST OF REFERENCE DESIGNATIONS

1 Bearing element
10 Stabilizer
11 Elastomer body
12 Elastomer body
13 Receiving passage
14 Stabilizer rod
15 Inner contour
15' Inner contour
16 Thickened portion
17 Joining direction
18 Receiving means
19 Indentation
20 Adhesion promoter layer
21 Parting plane
22 Motor vehicle component
F Assembly force

What is claimed is:

1. A bearing element for receiving a stabilizer on a vehicle, the bearing element comprising:
a first elastomer body and a second elastomer body that are half-shell shaped and that are disposed on one another so as to form a receiving passage for receiving a stabilizer rod of the stabilizer, with an inner contour of the receiving passage deviating from a circular contour, wherein the first and second elastomer bodies are configured to be pressed onto and cohesively attached to the stabilizer rod such that the stabilizer rod extends through the receiving passage; and
an adhesive or an adhesion promoter configured to be disposed between the first and second elastomer bodies and the stabilizer rod, wherein the inner contour of the receiving passage is configured such that the adhesive or the adhesion promoter is pressed uniformly between the inner contour and the stabilizer rod when the first and second elastomer bodies are pressed onto the stabilizer rod.

2. The bearing element of claim 1 wherein the inner contour of the receiving passage is configured such that a uniform distribution of the adhesive or the adhesion promoter is generated over a circumference of the stabilizer rod when the first and second elastomer bodies are pressed onto the stabilizer rod.

3. The bearing element of claim 1 wherein the inner contour of the receiving passage comprises thickened portions that project into the receiving passage for guiding the stabilizer rod, the thickened portions being deformable when the first and second elastomer bodies are disposed on the stabilizer rod.

4. The bearing element of claim 3 wherein the first and second elastomer bodies are joined together from a joining direction, wherein the thickened portions are formed in the inner contour laterally with respect to the joining direction.

5. The bearing element of claim 3 wherein the first and second elastomer bodies are joined together from a joining direction, wherein the thickened portions are formed in the inner contour in a region of the joining direction.

6. The bearing element of claim 1 further comprising two or four thickened portions disposed over a circumference of the inner contour.

7. The bearing element of claim 1 further comprising thickened portions disposed in the inner contour in a state in which the elastomer bodies are not subjected to force.

8. A method for arranging a bearing element on a stabilizer rod of a stabilizer for a vehicle, the method comprising:
positioning a first elastomer body and a second elastomer body on one another so as to form a receiving passage for the stabilizer rod of the stabilizer, wherein the first and second elastomer bodies each have a half-shell shape, wherein the receiving passage has an inner contour that deviates from a circular contour; and
pressing the first and second elastomer bodies onto the stabilizer rod with elastic deformation of the inner contour of the receiving passage such that the inner contour molds onto a contour of the stabilizer rod and such that the stabilizer rod of the stabilizer extends through the receiving passage.

9. The method of claim 8 wherein at least one of the first or second elastomer bodies is received in a receiving means, the method further comprising shaping the receiving means to form a deviation of the inner contour that deviates from the circular contour.

10. The method of claim 9 wherein the receiving means comprises an indentation that is geometrically replicated in the at least one of the first or second elastomer bodies received in the receiving means when an assembly force is applied, thereby forming a thickened portion that points into the inner contour.

11. The method of claim 8 further comprising pressing uniformly an adhesive or an adhesion promoter between the inner contour and the stabilizer rod when the first and second elastomer bodies are pressed onto the stabilizer rod.

12. The method of claim 8 further comprising generating a uniform distribution of an adhesive or an adhesion promoter over a circumference of the stabilizer rod when the first and second elastomer bodies are pressed onto the stabilizer rod.

13. The method of claim 8 wherein a portion of the inner contour that deforms when the first and second elastomer bodies are pressed onto the stabilizer rod is a thickened portion.

14. A bearing element for receiving a stabilizer on a vehicle, the bearing element comprising a first elastomer body and a second elastomer body that are half-shell shaped and that are disposed on one another so as to form a receiving passage for receiving a stabilizer rod of the stabilizer, with an inner contour of the receiving passage deviating from a circular contour, wherein the first and second elastomer bodies are configured to be pressed onto and cohesively attached to the stabilizer rod such that the stabilizer rod extends through the receiving passage, wherein at least one of the first or second elastomer bodies is seated in a receiving means, wherein a deviation of the inner contour is formed by a shaping of the receiving means.

15. The bearing element of claim 14 wherein the inner contour of the receiving passage is configured such that a uniform distribution of the adhesive or the adhesion promoter is generated over a circumference of the stabilizer rod when the first and second elastomer bodies are pressed onto the stabilizer rod.

16. The bearing element of claim 14 wherein the inner contour of the receiving passage comprises thickened portions that project into the receiving passage for guiding the stabilizer rod, the thickened portions being deformable when the first and second elastomer bodies are disposed on the stabilizer rod.

17. The bearing element of claim 16 wherein the first and second elastomer bodies are joined together from a joining direction, wherein the thickened portions are formed in the inner contour laterally with respect to the joining direction.

18. The bearing element of claim 16 wherein the first and second elastomer bodies are joined together from a joining direction, wherein the thickened portions are formed in the inner contour in a region of the joining direction.

19. The bearing element of claim 14 further comprising two or four thickened portions disposed over a circumference of the inner contour.

20. The bearing element of claim 14 further comprising thickened portions disposed in the inner contour in a state in which the elastomer bodies are not subjected to force.

* * * * *

UNITED STATES PATENT AND TRADEMARK OFFICE
CERTIFICATE OF CORRECTION

PATENT NO. : 11,007,840 B2  
APPLICATION NO. : 15/559285  
DATED : May 18, 2021  
INVENTOR(S) : Dieter Lechner and Sebastian Bernard Page 1 of 1

It is certified that error appears in the above-identified patent and that said Letters Patent is hereby corrected as shown below:

On the Title Page

In item (73) "Assignees":  
ThyssenKrupp Federo und Stabilisatoren GmbH  
Should be:  
ThyssenKrupp Federn und Stabilisatoren GmbH.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*